(12) United States Patent
Jones

(10) Patent No.: US 7,412,864 B2
(45) Date of Patent: Aug. 19, 2008

(54) METHOD OF FORMING TRAILER RECEIVER

(75) Inventor: Darrin F. Jones, Trucksville, PA (US)

(73) Assignee: Alliance Metal Forming, LLC, Wadsworth, OH (US)

( * ) Notice: Subject to any disclaimer, the term of this patent is extended or adjusted under 35 U.S.C. 154(b) by 0 days.

(21) Appl. No.: 11/746,381

(22) Filed: May 9, 2007

(65) Prior Publication Data

US 2007/0261459 A1    Nov. 15, 2007

Related U.S. Application Data

(60) Provisional application No. 60/798,927, filed on May 9, 2006.

(51) Int. Cl.
*B21C 23/04* (2006.01)

(52) U.S. Cl. .......................... 72/264; 72/359; 72/370.1

(58) Field of Classification Search .................... 72/264, 72/266, 267, 358, 359, 370.01, 370.1
See application file for complete search history.

(56) References Cited

U.S. PATENT DOCUMENTS 6,931,904 B2    8/2005    Jones et al.
6,931,906 B2 *  8/2005    Sorgi ....................... 72/370.03

* cited by examiner

*Primary Examiner*—Derris H. Banks
*Assistant Examiner*—Debra M Wolfe
(74) *Attorney, Agent, or Firm*—Buckingham, Doolittle & Burroughs, LLP

(57) ABSTRACT

The present invention relates to an improved method of forming a trailer receiver for use in connection with a trailer hitch assembly for towing trailers, campers, boats and the like. The invention relates to an improved method for forming a trailer receiver that utilizes cold forward extrusion and a tooling arrangement to efficiently and cost effectively produce custom trailer receivers.

26 Claims, 10 Drawing Sheets

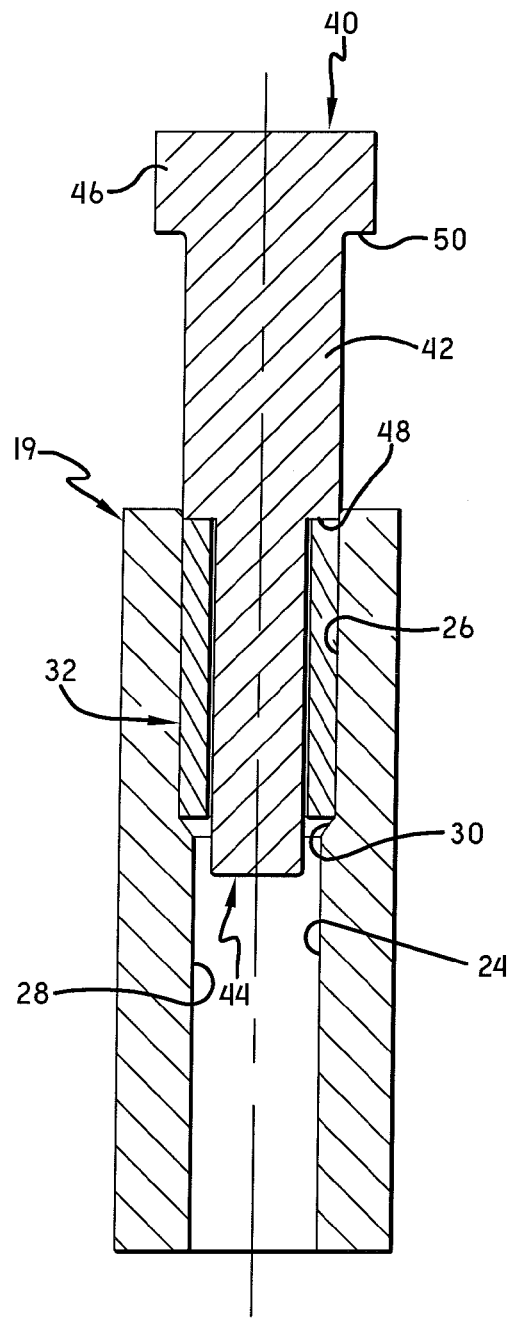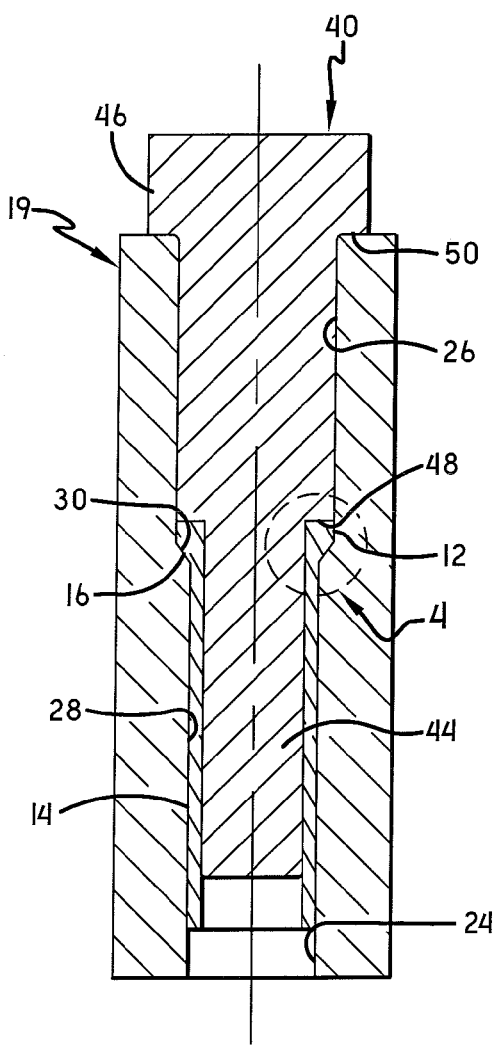
FIG.-2
PRIOR ART
FIG.-3
PRIOR ART

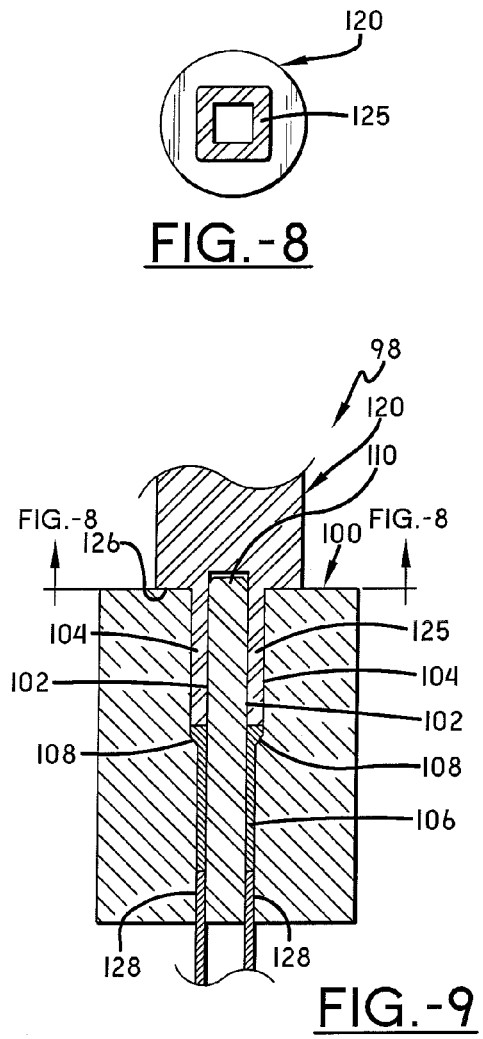
FIG.-8
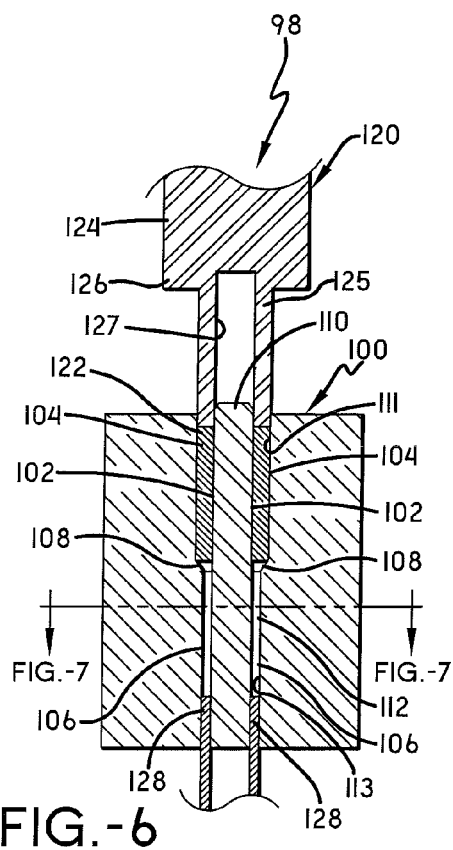
FIG.-6
FIG.-9
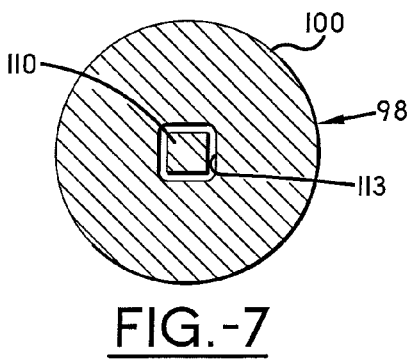
FIG.-7

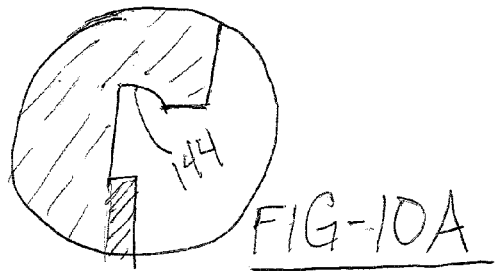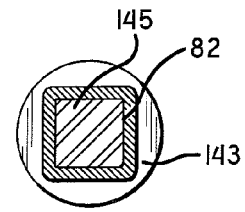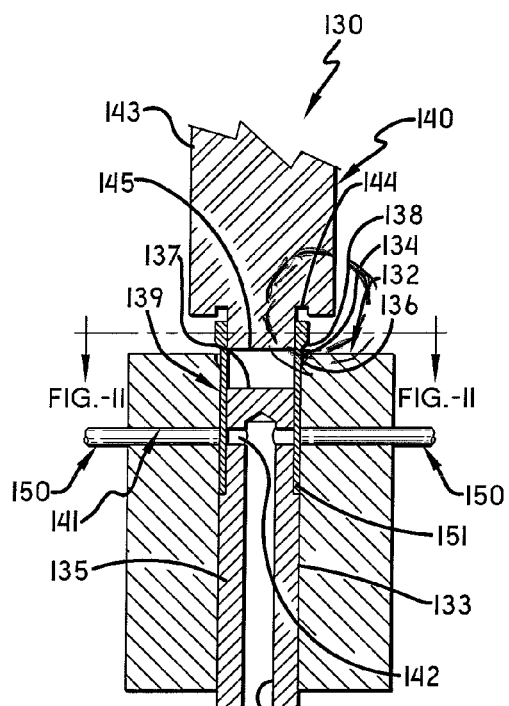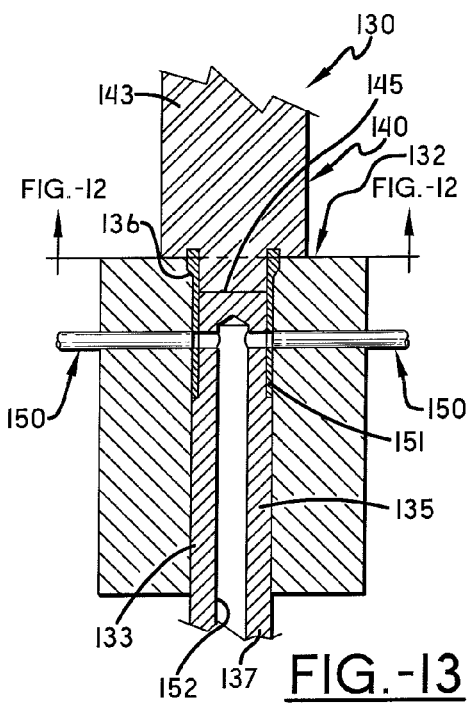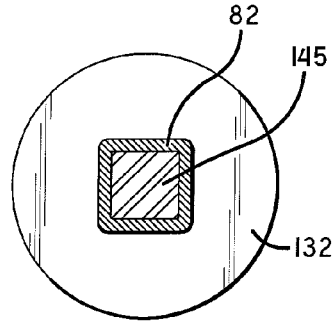

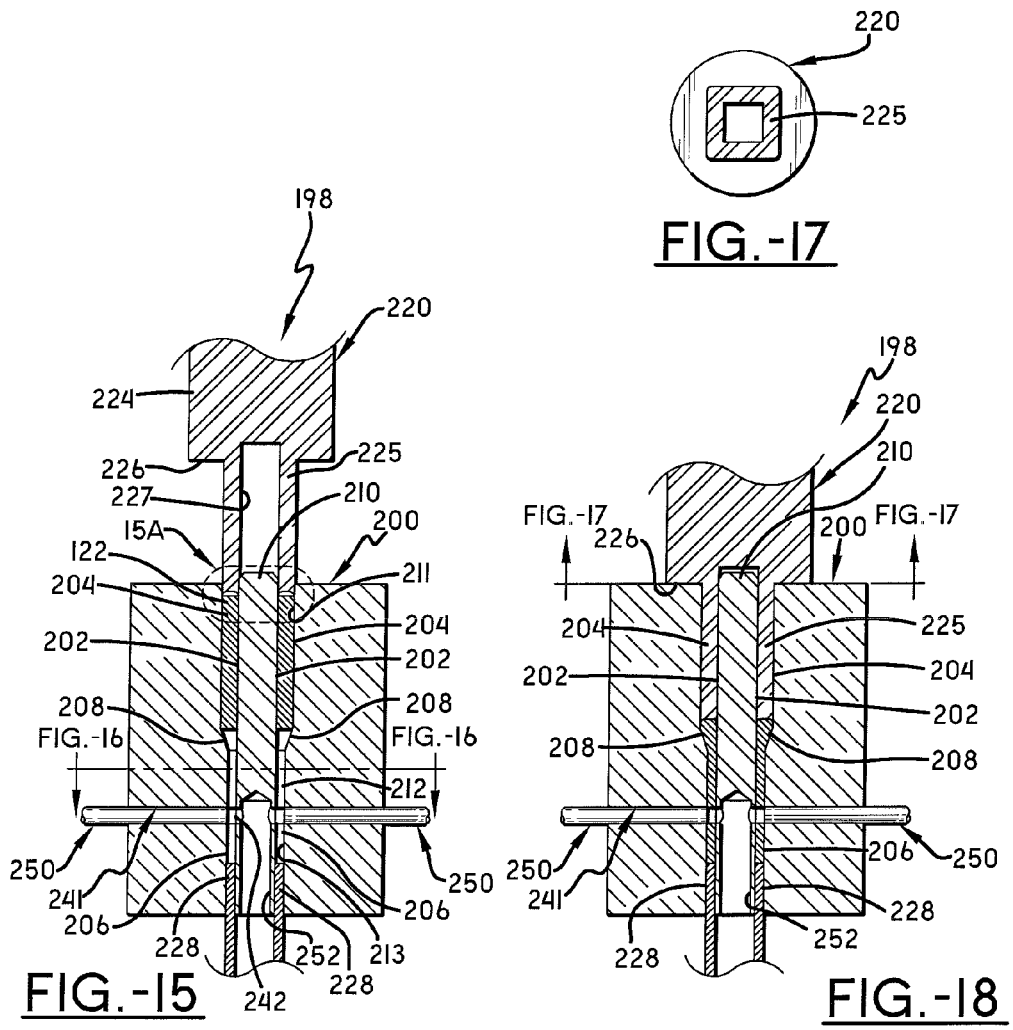
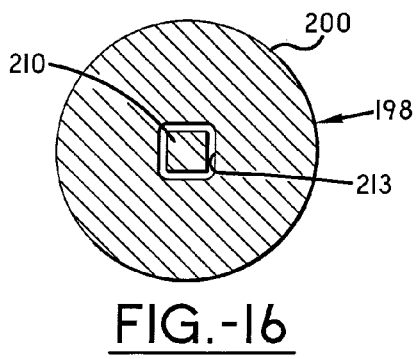

METHOD OF FORMING TRAILER RECEIVER

TECHNICAL FIELD

The invention of this application relates to an improved method of forming a trailer receiver for use in connection with a trailer hitch assembly for towing trailers, campers, boats and the like. More specifically, the invention relates to an improved method for forming a trailer receiver that utilizes cold forward extrusion and a tooling arrangement to efficiently and cost effectively produce custom trailer receivers, and eliminates the need for additional processing steps which are both costly and undesirable.

BACKGROUND OF THE INVENTION

Motor vehicles often employ a hitch assembly for towing a trailer. The typical hitch assembly is mounted to the rear of the motor vehicle and includes a hitch receiver or receiver tube and a removable hitch bar. The hitch receiver tube is fixedly mounted to the motor vehicle using brackets and/or welds, and is sized to receive the hitch bar therein. The hitch bar typically has a ball or tongue onto which the trailer is mounted.

In most conventional hitch assemblies, the hitch receiver tube includes a reinforcing collar or ring mounted on the end of the hitch receiver tube into which the hitch bar is inserted. The protective collar or ring protects the inside shape of the tube from being deformed. Typically this protective collar or ring is welded onto the hitch receiver tube. While this method of construction has served well in the past, welding of the collar or ring onto the hitch receiver tube has several disadvantages. For one, the weld, which is visible from the rear of the motor vehicle on which the receiver is installed, is not aesthetically pleasing. Second, the weld increases the likelihood of water and debris such as road salt being retained in the receiver, which can result in the formation of rust and reduce the overall useful life of the receiver. Finally, using a multiple piece assembly for the hitch receiver tube results in greater shipping, handling, and manufacturing costs than does employing a single piece assembly.

An additional problem associated with prior art receivers is that their method of manufacture frequently resulted in voids in the inside wall of the receiver. These voids tend to weaken the strength of the receiver and serve as gathering locations for moisture and other debris such as road salt which, over time, lead to corrosion and tend to shorten the useful life of the receiver.

To overcome the abovementioned problems associated with prior art receivers, including multi-piece receivers, some have developed a method of forming a one-piece trailer receiver tube using hollow forward extrusion, such as disclosed in U.S. Pat. No. 6,931,904 (the "'904 patent"), More specifically, the '904 patent discloses a method of forging a trailer receiver tube by providing a die having an inner surface defining a first portion and a second portion, a hollow tube having an outer surface, and a punch having a body and a shaft extending therefrom sized to fit within the hollow tube. The hollow tube is loaded within the first portion of the die, and the punch is then inserted into the hollow tube such that the body abuts an end of the hollow tube and the shaft extends therethrough. The punch and the hollow tube is then advanced through the die such that a portion of the hollow tube is extruded into the second portion of the die and the outer surface of the hollow tube conforms to the inner surface of the die to thereby form the trailer receiver tube.

However, this method of forging is undesirable for a number of reasons. First, the method of forging a trailer receiver tube described in the '904 patent does not address the customer driven request for a rounded or smooth outer edge on the head portion. Rather, the method taught by the '904 patent results in a receiver with a sharp edge on the head portion which can cause injury to an operator engaging or disengaging the trailer tube assembly, which is both dangerous and undesirable. In an effort to remove said sharp edge, some operators have incorporated post processing techniques such as grinding down the edge, which is both costly and time consuming and therefore inefficient.

Second, prior art devices such as the one used in the '904 patent tend to fail prematurely. It is believed that this premature failure is due in part to excess pressure buildup in the cavity of the device Once the device fails, the operator must either repair or replace the failed device, which can be both costly and time consuming and therefore inefficient.

So that the structure, method, operation and advantages of the trailer receiver of the present invention can be best understood, a prior art method of forming a trailer receiver tube using cold forward extrusion is described below and shown in FIGS. 1 through 4. Referring to FIG. 1 of the drawings, there is illustrated receiver tube 10 formed in accordance with the method described in the '904 patent. Receiver tube 10 is intended to be mounted beneath the floor pan or bumper of a motor vehicle (not shown), and is configured to receive a conventional hitch bar (not shown) of a type that is well known in the art. Receiver tube 10 is unitarily formed and has a generally rectangular lateral cross section and comprises outer surface 11, head portion 12 and body portion 14. As illustrated in FIG. 1, head portion 12 transitions to body portion 14 through chamfered portion 16.

Head portion 12 is located at a distal end of receiver tube 10 for receipt of a hitch bar (not shown) and provides a protective collar around receiver tube 10. Body portion 14 extends from head portion 12 in the direction of the motor vehicle (not shown) and is adapted for mounting on said vehicle. Body portion 14 further comprises hole 18 formed therein for receiving a locking pin (not shown) once the hitch bar (not shown) has been inserted into receiver tube 10.

As illustrated in FIGS. 2 and 3, receiver tube 10 is formed using hollow forward (direct) extrusion. Die 19 is provided that defines inner surface 24 having first portion 26 and second portion 28. First portion 26 is characterized as defining an opening that is somewhat larger than that of second portion 28. Chamfer forming portion 30 extends between first portion 26 and second portion 28, and is used to form chamfered portion 16 as described more fully below.

Tubular blank 32 is provided, which is made from a unitary piece of material, such as an ATSM A500 grade steel, or some other suitable material. Tubular blank 32 is illustrated to have a rectangular cross-sectional area, but those skilled in the art will appreciate that various other shaped cross sections may be employed. During the loading stage, as depicted in FIG. 2, tubular blank 32 is placed in die 19 within first portion 26. Tubular blank 32 is sized relatively larger than second portion 28 of die 19 and, as such, remains within first portion 26 during the loading stage.

Punch 40 is provided having body 42, shaft 44 that extends from an end of body 42 and base 46 that is formed on an opposite end of body 42. Contact surface 48 is formed at the transition between body 42 and shaft 44, and body 42 is sized to fit within first portion 26 of die 19. Shaft 44 is sized to fit within tubular blank 32.

During the loading stage as shown in FIG. 2, punch 40 is inserted into tubular blank 32 such that shaft 44 extends into tubular blank 32 and contact surface 48 engages loading end 36. As illustrated in FIG. 2, shaft 44 extends completely through tubular blank 32 at this stage.

Receiver tube 10 is formed by hollow forward extruding blank 32 through die 19 using the punch 40 as illustrated in FIG. 3. Preferably, punch 40 is urged into die 19 under ambient temperature conditions by a press ram (not shown). Alternatively, punch 40 may be urged into die 19 at elevated temperatures. The contact surface 48 engages tubular blank 32 and forces tubular blank 32 into second portion 28 of die 19.

Fixed between shaft 44 of punch 40 and die 19, tubular blank 32 is subjected to compression forces as it is urged into second portion 28 causing tubular blank 32 to increase in longitudinal length while simultaneously decreasing in wall thickness. The portion of tubular blank 32 that is extruded into second portion 28 forms body portion 14 of receiver tube 10.

Punch 40 is urged into die 19 by a press ram (not shown) until such time as shim blocks (not shown) or a stroke limit on the press ram terminates the movement of punch 40. A portion of tubular blank 32 remains within first portion 26 of die 19 (i.e. is not extruded through second portion 28) and thus forms head portion 12. Accordingly, head portion 12 retains the characteristics of blank 32 prior to insertion into die 19, and acts as a reinforcing area for newly formed receiver tube 10. Chamfer forming portion 30 forms chamfered portion 16 which acts as the transition between head portion 12 and body portion 14. Punch 40 is then retracted from die 19 by a reverse stroke of the press ram (not shown). At that time, a knock-out stroke is initiated by the press ram to remove receiver tube 10 from die 19. Using the above extrusion method, outer surface 11 of receiver tube 10 is defined by inner surface 24 of die 19.

Turning now to FIG. 4 which depicts the cross-sectional view of head portion 12, chamfered portion 16, and body portion 14 of receiver tube 10 and illustrates the alignment of the grain within receiver tube 10 after forming using the method described above. Specifically, the grain of the material within head portion 12 and body portion 14 extends parallel to the longitudinal axis of receiver tube 10 (e.g. in the direction of the cold forward extrusion), and the grain in chamfered portion 16 runs at an angle to the longitudinal axis of receiver tube 10 and parallel to the outer surface of chamfered portion 16. The grains within body portion 14 are also compressed and closer together than the grains within head portion 12. By preserving the grain flow of tubular blank 32 within head portion 12, characteristics such as grain ends or voids are eliminated, and using cold forward extrusion to form body portion 14 preserves directional grain alignment.

Notwithstanding, the forgoing, the method of forming a trailer receiver tube described in the '904 patent results in a receiver with a number of undesirable characteristics. More specifically, the method described in the '904 patent does not address the customer driven request for a rounded or smooth outer edge on the head portion thereby necessitating secondary processing techniques such as grinding, which is both time consuming and costly, to avoid potential injury to the receiver operator due to the sharp surface. The method also does not address the customer driven demand for an angle between head portion 12 and chamfered portion 16 that is in excess of 30 degrees.

SUMMARY OF THE INVENTION

The present invention relates to an improved method of forming a trailer receiver for use in connection with a trailer hitch assembly for towing trailers, campers, boats and the like. The invention relates to an improved method for forming a trailer receiver that utilizes cold forward extrusion and a tooling arrangement to efficiently and cost effectively produce custom trailer receivers, and eliminates the need for additional processing steps which are both costly and undesirable. It is foreseen by the invention that the tooling station may be implemented in a bi-station or single station arrangement.

The present invention solves the above-described problems of prior art methods by providing an efficient method of forming a single piece trailer receiver tube that substantially eliminates the voids in the inner wall of the receivers formed by prior art methods, increases the life of the device, and that addresses the customer driven demand for a dull-edged head portion wherein the head portion has no sharp edges, including, for example edges that are rounded or beveled. Providing for a dull-edged head portion allows for a hitch receiver that is easy to handle and operate, and which substantially reduces the likelihood of injury to the operator.

The general objective of the present invention is to provide the art with a new method for forming a single piece trailer receiver tube that eliminates the disadvantages found in prior art designs and methods.

These objectives and advantages are obtained by providing an improved method of forming a trailer receiver for use in connection with a trailer hitch assembly for towing trailers, campers, boats and the like as described herein. These and other objects of the present invention will become more readily apparent from a reading of the following detailed description taken in conjunction with the accompanying drawings wherein like reference numerals indicate similar parts, and with further reference to the appended claims.

BRIEF DESCRIPTION OF THE DRAWINGS

The preferred embodiment of the invention, illustrative of the best mode in which applicant has contemplated applying the principals is set forth in the following description and is shown in the drawings and is particularly and distinctly pointed out and set forth in the appended claims. The invention may take physical form in certain parts and arrangements of parts, numerous embodiments of which will be described in detail in the specification and illustrated in the accompanying drawings which form a part hereof, and wherein:

FIG. 2 is a cross-sectional view of the loading stage of the direct extrusion process of manufacturing a receiver tube of Prior Art;

FIG. 3 is a cross-sectional view of the punching process of the direct extrusion process of manufacturing a receiver tube of Prior Art;

FIG. 6 is a cross-sectional view of the loading stage of the first stage of one embodiment of the method of this invention using a bi-station tooling arrangement;

FIG. 7 is a perpendicular cross-sectional view of the loading stage of the first stage of the method of this invention shown in FIG. 6;

FIG. 8 is a perpendicular cross-sectional view of the punching process of the first stage of one embodiment of the method of this invention shown in FIG. 9;

FIG. 9 is a cross-sectional view of the punching process of the first stage of one embodiment of the method of this invention using a bi-station tooling arrangement;

FIG. 10 is a cross-sectional view of the loading stage of the second stage of the process of one embodiment of the method of this invention using a bi-station tooling arrangement;

FIG. 10A is an exploded view of the press of the cross-sectional view shown in FIG. 10;

FIG. 11 is a perpendicular cross-sectional view of the loading stage of the second stage of the process of one embodiment of the method of this invention as shown in FIG. 10;

FIG. 12 is a perpendicular cross-sectional view of the punching stage of the second stage of the process of one embodiment of the method of this invention shown in FIG. 13;

FIG. 13 is a cross-sectional view of the punching stage of the second stage of the process of one embodiment of the method of this invention using a bi-station tooling arrangement;

FIG. 15 is a cross-sectional view of the loading stage of the process of one embodiment of the method of this invention using a single station tooling arrangement;

FIG. 16 is a perpendicular cross-sectional view of the loading stage of the process of one embodiment of the method of this invention shown in FIG. 15;

FIG. 17 is a perpendicular cross-sectional view of the punching stage of the process of one embodiment of the method of this invention shown in FIG. 18;

FIG. 18 is a cross-sectional view of the punching stage of the process of one embodiment of the method of this invention using a single station tooling arrangement.

DETAILED DESCRIPTION OF THE INVENTION

Figure 1:
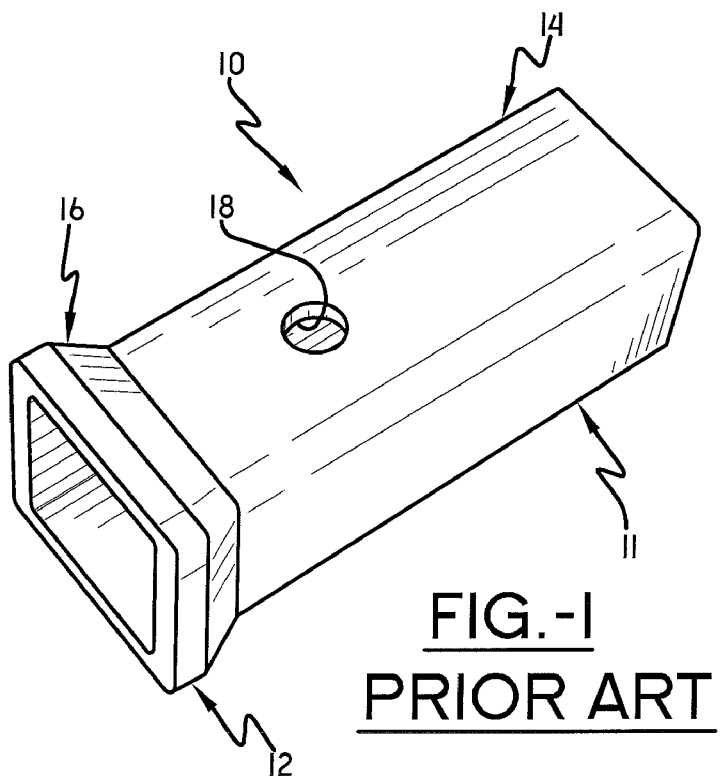
FIG. 1 is a perspective view of a receiver tube of Prior Art.
Figure 4:
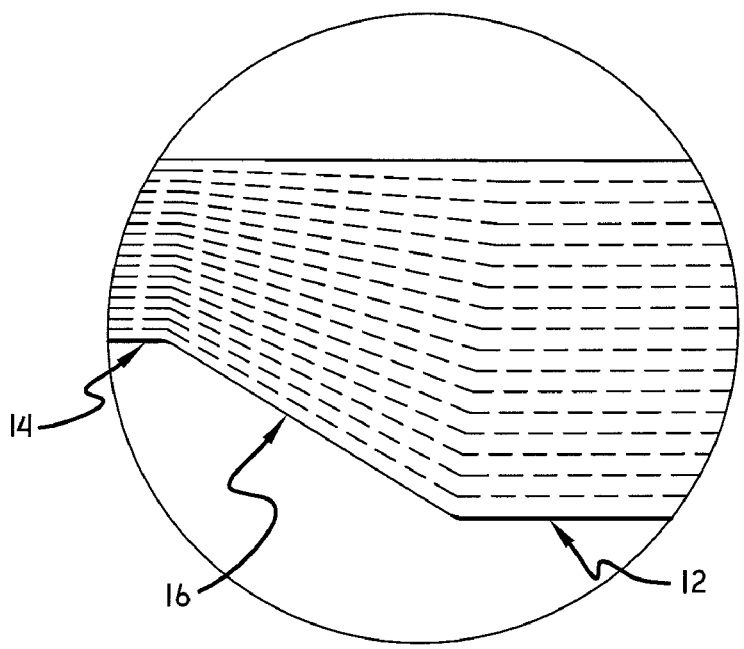
FIG. 4 is an exploded cross-sectional view of the material grain of a portion of the receiver tube of Prior Art.

Referring now to the drawings wherein the showings are for purposes of illustrating numerous embodiments of the invention only and not for purposes of limiting the same, the figures illustrate the improved method of forming a trailer receiver for use in connection with a trailer hitch assembly for towing trailers, campers, boats and the like. The invention relates to an improved method for forming a trailer receiver that utilizes cold forward extrusion and a tooling arrangement to efficiently and cost effectively produce custom trailer receivers, and eliminates the need for additional processing steps which are both costly and undesirable. It is foreseen that the tooling station can be a bi-station tooling arrangement or a single station tooling arrangement. As used in this application the term extrusion is used to mean the process of using a die to form a metal part, wherein the die is made from a material, commonly a metal, that is less malleable than the metal of the part being formed therein. The process forms the more malleable metal part to the general shape of the less malleable die it is inserted into.

Figure 5:
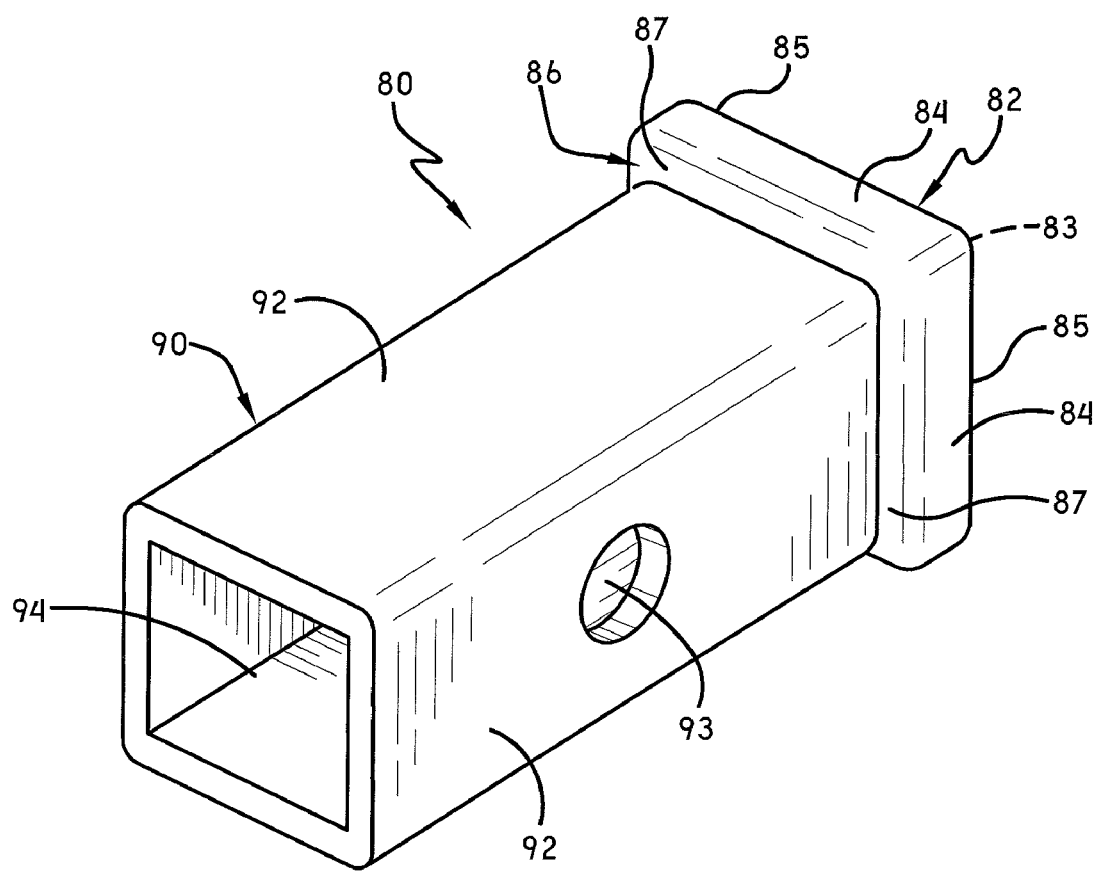
FIG. 5 is a perspective back view of a receiver of an embodiment of this invention.
Figure 5A:
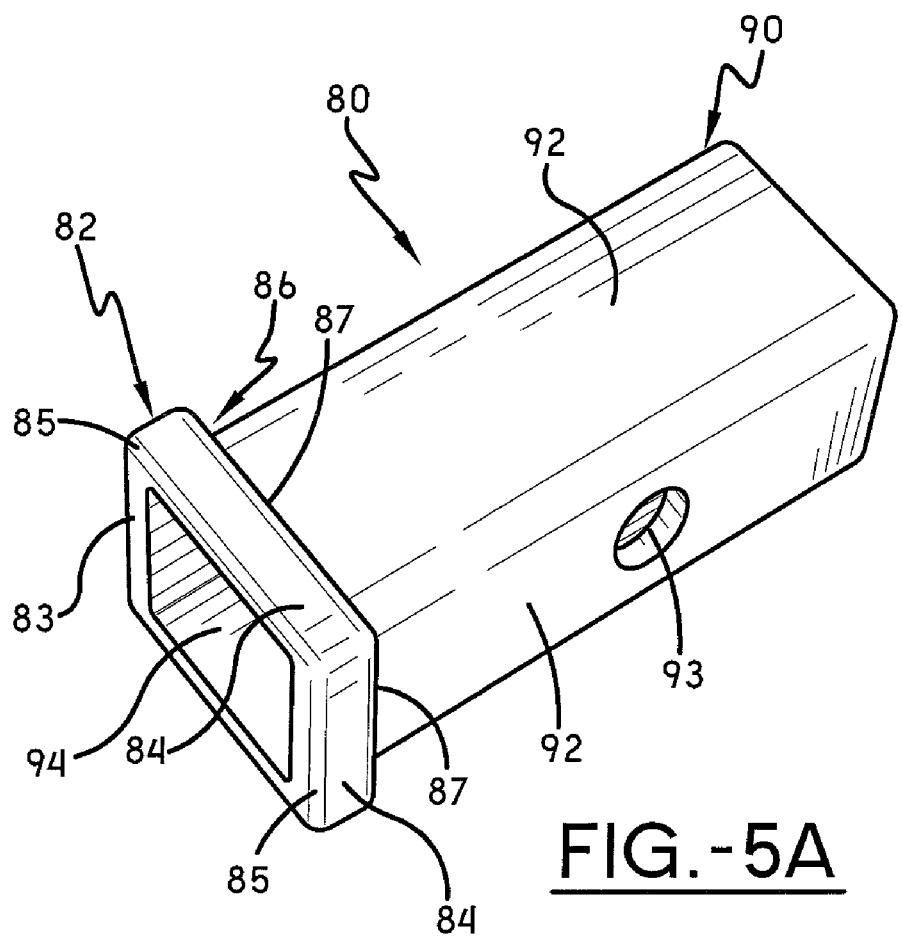
FIG. 5A is a perspective front view of a receiver of an embodiment of this invention.

A trailer receiver that is constructed according to the method of the present invention is indicated generally at 80 in FIGS. 5 and 5A, and is intended to be mounted beneath the floor pan or bumper of a motor vehicle (not shown), and is configured to receive a conventional hitch bar (not shown) of the type that is well known in the art. Receiver 80 is unitarily formed by the method of the present invention, as described more fully below, and preferably has a generally rectangular lateral cross section though it is contemplated that other geometric shapes including, without limitation, any n-sided polygon, or shape that combines any n-sided polygon with circular sections, a square, octagon, or ellipse, could also be used without affecting the overall concept of the invention.

Receiver 80 comprises head portion 82, transition portion 86, body portion 90, and continuous opening 94 formed therein More specifically, head portion 82 and body portion 90 are connected by transition portion 86, as best illustrated in FIGS. 5 and 5A. In the preferred embodiment, head portion 82 further comprises face 83 and a plurality of sides 84, with each of said sides 84 coming together with face 83 to form a dull edge, such as a rounded or beveled edge 85. Head portion 82 is located at a distal end of receiver 80 for receipt of a hitch bar (not shown) in opening 94 and provides a protective collar around receiver 80.

Transition portion 86 is comprised of a plurality of sides 87. Each of said sides 87 are connected to a corresponding side 84 of head portion and extend toward the motor vehicle (not shown). Similarly, body portion 90 is also comprised of a plurality of sides 92. Each of said sides 92 is in turn connected to a corresponding side 87 of transition portion 86 and body portion 90 extends toward, and is adapted for mounting to, the motor vehicle (not shown). At least one side 92, and preferable two sides, comprises opening 93 formed therein for receiving a locking pin (not shown) once the hitch bar (not shown) has been inserted into receiver 80.

A cross section of a device for performing the method of the present invention is shown generally at 98 in FIGS. 6 and 7. First device 98 comprises first die 100, first punch 120 and bottom portion 128, each of which is preferably formed of a durable metal such as steel, though it is contemplated that other types of durable materials such as titanium or iron or alloys thereof could also be used without affecting the overall concept of the present invention.

First die 100 further comprises first exterior forming wall 102 and first mandrel 110. First exterior forming wall 102 further comprises a first head forming portion 104, a first body forming portion 106, and a first transition forming portion 108. First head forming portion 104 and first mandrel 110 form opening 111 which is in turn used to form head portion 82 of receiver 80 as described more fully below. Similarly, first transition forming portion 108 and first mandrel 110 form an opening 112 for forming transition portion 86 of receiver 80, and first body forming portion 106 and first mandrel 110 form opening 113 for forming body portion 90 as described more fully below. In the preferred embodiment of the present invention, the angle created by transition forming portion 108 and head forming portion 104 is between 1 and 30 degrees, though it is contemplated the angle could be greater without affecting the overall concept of the present invention.

First punch 120 is comprised of head portion 124 and shaft 125 that extends from head portion 124 toward die 100, as best illustrated in FIGS. 6 and 8. Stroke stop 126 is formed at the transition of head portion 124 and shaft 125. Shaft 125 is sized accordingly to fit within the space created between head forming portion 104 and mandrel 110, and further comprises opening 127 therein for receipt of mandrel 110 as further described below.

Having described the preferred embodiment of receiver 80, the method of the present invention used to form receiver 80 will now be described. A tubular blank 122 is provided, which is made from a unitary piece of material, such as an ATSM A500 grade steel, or some other suitable material. The only limitation to the material of tubular blank 122 is that the material must be more malleable than the material used to construct the die and punch of the device used to make the hitch receiver.

In the preferred embodiment of the present invention, tubular blank 122 has a generally rectangular cross-sectional area, but those skilled in the art will appreciate that various other shaped cross sections may be employed without affecting the overall concept of the present invention. During the loading stage, as depicted in FIG. 6, tubular blank 122 is inserted into opening 111 between first head forming portion 104 and first mandrel 110. Tubular blank 122 is sized relatively larger than opening 113 between first body forming portion 106 and first mandrel 110 and, as such, remains within opening 111 between first head forming portion 104 and first mandrel 110 during the loading stage. Shaft 125 of first punch 120 is then inserted into first die 100 such that the shaft 125 is positioned directly above and is in contact with the top of tubular blank 122.

Receiver 80 is formed by forward extruding tubular blank 122 into first die 100 using punch 120 as illustrated in FIGS. 6 and 9. More specifically, shaft 125 engages tubular blank 122 and forces a portion of tubular blank into each of openings 112, 113 of die 100 until stroke stop 126 comes into contact with the upper surface of first die 100 as best illustrated in FIG. 9. Preferably, shaft 125 of first punch 120 is urged into first die 100 under ambient temperature conditions by a press ram (not shown) though it is contemplated that other types of mechanical devices can be utilized without affecting the overall concept of the present invention. Likewise, it is also contemplated that first punch 120 could be urged into first die 100 at cooler or elevated temperatures without affecting the overall concept of the present invention.

As an important feature of the present invention, fixed between first exterior forming walls 102 and first mandrel 110, tubular blank 122 is subjected to compression forces as it is urged into opening 113 between first body forming portion 106 and first mandrel 110 causing tubular blank 122 to increase in longitudinal length while simultaneously decreasing in wall thickness. The portion of tubular blank 122 that is extruded into opening 113 between body forming portion 106 and mandrel 110 forms the body portion 90 of the receiver 80. Likewise, the portion of tubular blank 122 that is extruded into opening 112 between first transition forming portion 108 and mandrel 110 forms the transition portion 86 of receiver 80. Upon completion of its downward stroke, first punch 120 is removed from first die 100 through a reverse stroke of the press ram (not shown), and receiver 80 is removed from first die 100 through any of a variety of means commonly known in the art such as through the use of ejector pins (not shown). Opening 93 can also be formed in at least one and preferably two sides 92 for receiving a locking pin (not shown) once the hitch bar (not shown) has been inserted into receiver 80. Opening 93 can be formed by any traditional means known in the art such as through the use of a drill (not shown), and receiver 80 is ready for installation on a motor vehicle.

Notwithstanding the forgoing, in a preferred embodiment of the method of the present invention, receiver 80 can be further refined by placing receiver 80 into second device 130, a cross section of which is shown generally in FIGS. 10 through 13. Second device 130 comprises second die 132, second punch 140 and optional side punch 150, each of which is preferably formed of a durable metal such as steel, again made of a material that is less malleable than the material of the tubular blank, though it is contemplated that other types of durable materials such as titanium or iron could also be used without affecting the overall concept of the present invention.

As best illustrated in FIGS. 11 and 13, die 132 further comprises second exterior forming walls 133 having second head forming portion 134, second body forming portion 135, second transition forming portion 136, and second mandrel 137. Second head forming portion 134 and second mandrel 137 form opening 138 which is in turn used to further form head portion 82 of receiver 80 as described more fully below. Similarly, second transition forming portion 136 and second mandrel 137 form opening 139 which is used to further increase the angle of transition portion 86 from the range of 1 to 90 degrees to a preferable range of 10 to 60 degrees and to a most preferable 11 range of 30 to 50 degrees without affecting the overall concept of the present invention.

In the preferred embodiment of the present invention, body forming portion 135 has a continuous opening 141 formed therein for receipt of an optional side punch 150, as best shown in FIGS. 10, 10A and 13, for creating opening 93 in body portion 90 of receiver 80 as described more fully below. Likewise, mandrel 137 has a corresponding continuous opening 142 formed therein so as to permit side punch 150 to pass through both die 132 and mandrel 137. Continuous openings 141 and 142 are preferably circular in shape and generally perpendicular to exterior forming walls 133, though it is contemplated that other geometric shapes could be used, such as a rectangle, square, ellipse, etc., without affecting the overall concept of the present invention.

Mandrel 137 further comprises a stop 151 and a generally vertical opening 152 longitudinally formed therein to allow for the easy removal of the pieces (not shown) of body portion 90 punched out by side punch 150, as described more fully below. A bucket or other container (not shown) can be placed below opening 152 to gather the punched pieces for disposal or recycling.

Punch 140 is of a type ordinarily known in the art and is comprised of head punch portion 143, reservoir portion 144 and shaft portion 145 that extends from head punch portion 143 towards die 132, as best illustrated in FIGS. 10, 10A and 13. More particularly, shaft 145 is sized to fit within the head portion 82 of receiver 80 and extends from head portion 143 toward die 132 so as to just contact mandrel 137 at the bottom of a press stroke as described more fully below. Reservoir 144 is shaped and sized so as to accommodate face 83 and a portion of sides 84 of head portion 82. As an important feature of the method of the present invention, the interior of reservoir 144 is concave, such that it is rounded or beveled as shown in FIGS. 10 and 10A so as to round or bevel face 83 and a portion of sides 84 to achieve the customer driven demand for rounded or beveled edge 85. In the preferred embodiment, side punch 150 is a cylindrically-shaped punch rod of a type commonly known in the art.

Having generally described the structure of second device 130, the method of further refining receiver 80 will now be described. During the loading stage, as depicted in FIGS. 10 and 10A, body portion 90 of receiver 80 is inserted into die 132 between body forming portion 135 of exterior forming walls 133 and mandrel 137, as illustrated in FIG. 10. When fully loaded into die 132, head portion 82 and transition portion 86 of receiver 80 extend outwardly from die 132, and the end or bottom of body portion 90 is in contact with stop 151. Shaft 145 of punch 140 is then inserted into opening 94 of receiver 80, and face 83 and a portion of sides 84 fit within reservoir 144 of punch 140, as illustrated in FIGS. 10, 10A and 13.

Receiver 80 is further refined by forward extruding receiver 80 into die 132 using punch 140 as illustrated in FIG. 13. More specifically, reservoir 144 engages head portion 82 of receiver 80 and, because further movement of body portion 90 is prevented by stop 151, compression forces urge head portion 82 and transition portion 86 of receiver 80 into openings 138, 139 until shaft 145 comes into contact with the upper surface of mandrel 137, as best illustrated in FIG. 13. Additionally, compression forces exerted by press ram (not shown) on head portion 94 cause face 83, and sides 82 adjacent to face 83, to conform to the interior shape of reservoir 144 and results in round or beveled edge 85 as discussed above.

Simultaneous with or before or following the downward press stroke of punch 140, side punch 150 is inserted through opening 141 in exterior forming wall 133 of die 132 so as to create opening 93 in at least two of sides 92 for receipt of a locking pin (not shown) once the hitch bar (not shown) has been inserted into receiver 80. More specifically, punch 150 displaces a portion of body portion 90 into opening 152, where it is permitted to be easily removed from mandrel 137 and die 132.

Preferably, shaft 145 of punch 140 and side punch 150 are urged into die 132 under ambient temperature conditions by a press ram (not shown) though it is contemplated that other types of mechanical devices can be utilized without affecting the overall concept of the present invention. Likewise, it is also contemplated that punch 140 and side punch 150 could be urged into die 132 at elevated temperatures without affecting the overall concept of the present invention.

Upon completion of their respective strokes, punch 140 and side punch 150 are removed from die 132 through a reverse stroke of their respective press rams (not shown), and receiver 80 is removed from die 132 through any of a variety of means commonly known in the art such as through the use of ejector pins (not shown).

Figure 14:
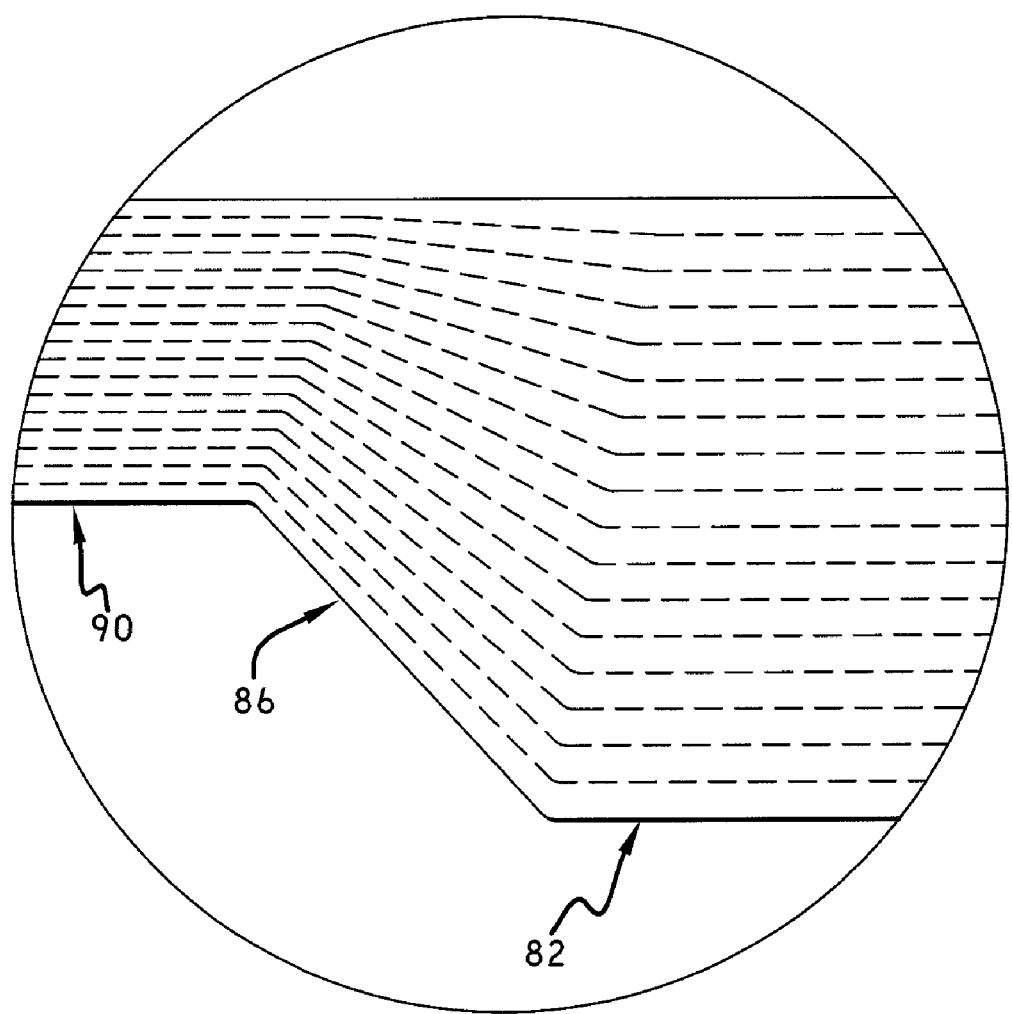
FIG. 14 is an exploded cross-sectional view of the material grain of a portion of the receiver tube manufactured using one embodiment of the process of this invention.

Turning now to FIG. 14 which depicts an exploded view of the cross-sectional view of head portion 82, transition portion 86, and body portion 90 of receiver 80 and illustrates the alignment of the grain within receiver 80 after forming using the method described above. Specifically, the grain of the material within head portion 82 and body portion 90 extends parallel to the longitudinal axis of receiver 80 (e.g. in the direction of the cold forward extrusion), and the grain in the transition portion 86 runs at an angle to the longitudinal axis of receiver 80 and parallel to the outer surface of transition portion 86. The grains within the body portion 90 are also compressed and closer together than the grains within the head portion 82.

The directional alignment of the grain within the head portion 82 and the body portion 90 provides improved strength properties. More specifically, by preserving the grain flow of the tubular blank 122 within the head portion 82, characteristics such as grain ends or voids are eliminated, and using cold forward extrusion to form the body portion 90 preserves directional grain alignment.

Figure 19:
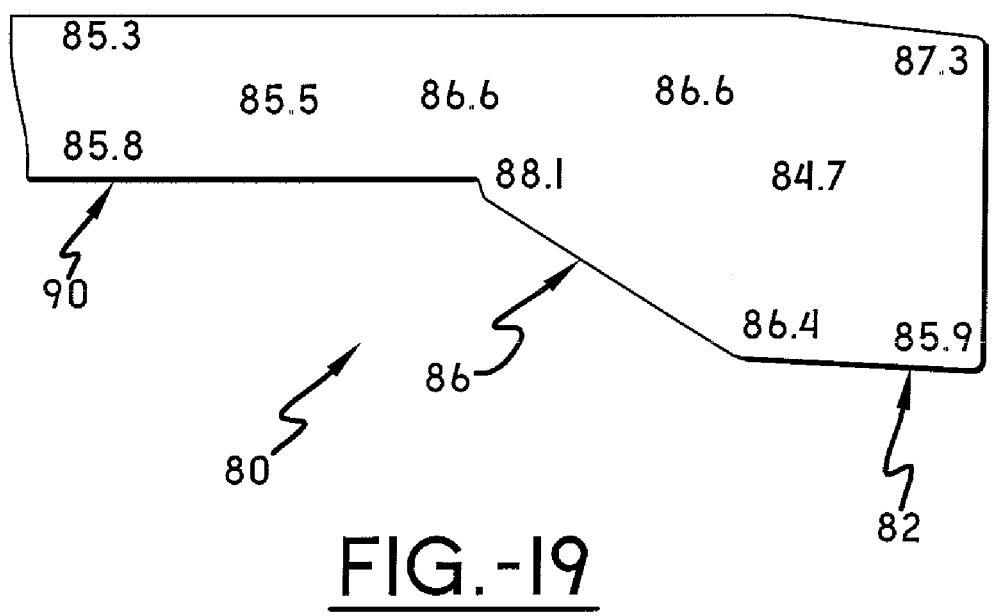
FIG. 19 is an illustration of the hardness uniformity across a cross section of a hitch receiver formed using the method of this invention.

A hardness survey was performed on a receiver hitched formed using the method described above. The hardness survey was performed using Vickers microhardness IAW ASTM E384, and was then converted to HRB IAW ASTM E140. The hardness of the receiver determined by this test is illustrated in FIG. 19. The uniformity of the hardness is evident by the minimal variation over head portion 82, transition portion 86, and body portion 90 of receiver 80.

It is further foreseen by certain embodiments of this invention that all aspects and purposes of the second device can be integrated with those of the first device to create a single station to form the receiver hitch having the improvements described within this invention. A cross section of a single device for performing the method of the present invention is shown generally at 198 in FIGS. 15 through 18. Similar to the first and second device explained above, single device 198 comprises die 200, punch 220 and bottom portion 228, each of which is preferably formed of a durable metal such as steel, though it is contemplated that other types of durable materials such as titanium or iron or alloys thereof could also be used without affecting the overall concept of the present invention.

Die 200 further comprises an exterior forming wall 202 and mandrel 210. Exterior forming wall 202 further comprises a head forming portion 204, a body forming portion 206, and a transition forming portion 208. Head forming portion 204 and mandrel 210 form opening 211 which is in turn used to form head portion 82 of receiver 80 as described more fully below. Similarly, transition forming portion 208 and mandrel 210 form an opening 212 for forming transition portion 86 of receiver 80, and body forming portion 206 and mandrel 210 form opening 213 for forming body portion 90 of receiver 80 as described more fully below. In a preferred embodiment of the present invention, the angle created by transition forming portion 208 and head forming portion 204 is between 1 and 90 degrees, more preferably 10-60 degrees and most preferably 30-50 degrees. It is, of course, also foreseen that the angle could be less than the preferred range and may in fact range from 1 to 90 degrees.

In the preferred embodiment of the present invention, body forming portion 206 has a continuous opening 241 formed therein for receipt of a side punch 250, as best shown in FIGS. 15 and 18, for creating opening 93 in body portion 90 of receiver 80 as described more fully below. Depending on the length of mandrel 210, some embodiments of the invention may require mandrel 210 to have a corresponding continuous opening 242 formed therein so as to permit side punch 250 to pass through both die 232 and mandrel 237. Co-longitudinal openings 241 and 242 are preferably circular in shape and generally perpendicular to exterior forming walls 233, though it is contemplated that other geometric shapes could be used, such as a rectangle, square, ellipse, etc., without affecting the overall concept of the present invention.

Figure 15A:
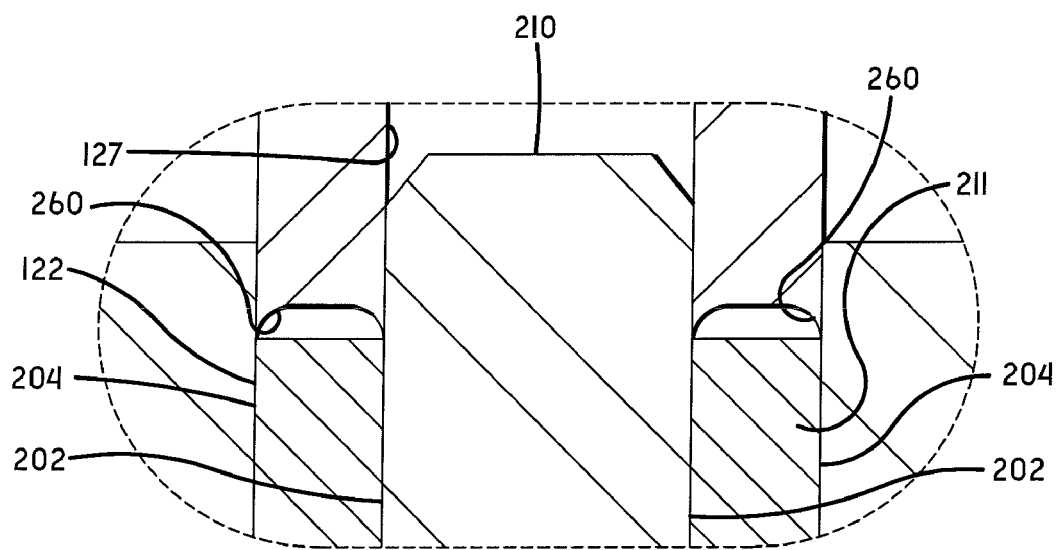
FIG. 15A is an exploded view of the head portion of the press shown in FIG. 15.

Punch 220 is comprised of head portion 224 and shaft 225 that extends from head portion 224 toward die 200, as best illustrated in FIGS. 15 and 18. Head portion 224 of punch 220 may be configured such to form the dull edges of head portion 82 of receiver hitch 80, as can be seen in FIGS. 15 and 15A. The head portion 82 of punch 220 will be concave in a preferred embodiment of the invention to provide for the dull edges of head portion 82 of receiver hitch 80, as best shown in FIG. 15A. Stroke stop 226 is formed at the transition of head portion 224 and shaft 225. Shaft 225 is sized accordingly to fit within the space created between head forming portion 204 and mandrel 210, and further comprises opening 227 therein for receipt of mandrel 210 as further described below.

Having previously described the preferred embodiment of receiver 80, the method of the present invention used to form receiver 80 with the single station tooling station is similar to that previously described above in the bi-station tooling station. A tubular blank 122 is provided, which is made from a unitary piece of material, such as an ATSM A500 grade steel, or some other suitable material. The only limitation to the material of tubular blank 122 is that the material must be more malleable than the material used to construct the die and punch of the device used to make the hitch receiver.

In the preferred embodiment of the present invention, tubular blank 122 has a generally rectangular cross-sectional area, but those skilled in the art will appreciate that various other shaped cross sections may be employed without affecting the overall concept of the present invention During the loading stage, as depicted in FIGS. 15 and 16, tubular blank 122 is inserted into opening 211 between head forming portion 204 and mandrel 210. Tubular blank 122 is sized relatively larger than opening 213 between body forming portion 206 and mandrel 210 and, as such, remains within opening 211 between head forming portion 204 and mandrel 210 during the loading stage. Shaft 225 of punch 220 is then inserted into die 200 such that the shaft 225 is positioned directly above and is in contact with the top of tubular blank 122.

Receiver 80 is formed by forward extruding tubular blank 122 into die 200 using punch 220 as illustrated in FIGS. 17 and 18. More specifically, shaft 225 engages tubular blank 122 and forces a portion of tubular blank into each of openings 212, 213 of die 200 until stroke stop 226 comes into contact with the upper surface of die 200 as best illustrated in FIG. 18. Preferably, shaft 225 of punch 220 is urged into die 200 under ambient temperature conditions by a press ram (not shown) though it is contemplated that other types of mechanical devices can be utilized without affecting the overall concept of the present invention. Likewise, it is also contemplated that punch 220 could be urged into die 200 at cooler or elevated temperatures without affecting the overall concept of the present invention.

As an important feature of the present invention, fixed between exterior forming walls 202 and mandrel 210, tubular blank 122 is subjected to compression forces as it is urged into opening 213 between body forming portion 206 and mandrel 210 causing tubular blank 122 to increase in longitudinal length while simultaneously decreasing in wall thickness. The portion of tubular blank 122 that is extruded into opening 213 between body forming portion 206 and mandrel 210 forms the body portion 90 of the receiver 80. Likewise, the portion of tubular blank 122 that is extruded into opening 212 between transition forming portion 208 and mandrel 210 forms the transition portion 86 of receiver 80.

Simultaneous with or before or following the downward press stroke of punch 220, side punch 250 is inserted through opening 241 in exterior forming wall 202 of die 200 so as to create opening 93 in at least two of sides 92 for receipt of a locking pin (not shown) once the hitch bar (not shown) has been inserted into receiver 80. More specifically, side punch 250 displaces a portion of body portion 90 into opening 152, where it is permitted to be easily removed from mandrel 210 and die 200.

Upon completion of their respective strokes, punch 220 and side punch 250 are removed from die 200 through a reverse stroke of their respective press rams (not shown), and receiver 80 is removed from die 200 through any of a variety of means commonly known in the art such as through the use of ejector pins (not shown).

Accordingly, the improved method of forming a trailer receiver is simplified, and provides an effective, safe, inexpensive, and efficient method which achieves all the enumerated objectives, eliminates costly and unnecessary steps encountered with prior art methods of forming a receiver, and solves problems and obtains new results in the art.

In the foregoing description, certain terms have been used for brevity, clearness, illustration and understanding; but no unnecessary limitations are to be implied therefrom beyond the requirements of the prior art, because such terms are used for descriptive purposes and are intended to be broadly construed. Moreover, this invention has been described in detail with reference to specific embodiments thereof, including the respective best modes for carrying Out each embodiment. It shall be understood that these illustrations are by way of example and not by way of limitation.

What is claimed is:

1. A method for forming a hitch receiver which comprises:
    placing a tubular blank into a first device, wherein said tubular blank includes a continuous opening throughout a length of said tubular blank, further wherein said first device comprises a first die having a longitudinal aperture disposed therein and a first punch wherein said first punch is sized to fit within said first die, further wherein said first die comprises a first inner mandrel sized to fit within at least a portion of said continuous opening throughout said length of said tubular blank and a first exterior forming wall of said first die wherein said first exterior forming wall comprises a first head forming portion connected to a first transition forming portion connected to a first body forming portion;
    extruding said tubular blank into said first device, wherein said tubular blank is extruded into said first die using said first punch such that said tubular blank is extruded into a volume between said first inner mandrel and said first exterior forming wall;
    removing said first punch from said first die;
    removing said tubular blank from said first device;
    placing said tubular blank into a second device wherein said second device comprises a second die having a longitudinal aperture disposed therein and a second punch wherein said second punch is sized to fit within said second die, further wherein said second die comprises a second inner mandrel sized to fit within at least a portion of said continuous opening throughout said length of said tubular blank and a second exterior forming wall, wherein said second exterior forming wall comprises a second head forming portion connected to a second transition forming portion connected to a second body forming portion; and
    extruding said tubular blank into said second device to from said hitch receiver, wherein said tubular blank is extruded into said second die using said second punch such that said tubular blank is extruded into a volume between said second inner mandrel and said second exterior forming wall.

2. The method of claim 1 wherein said tubular blank has a generally rectangular cross-section.

3. The method of claim 1 wherein said tubular blank is extruded through said first device at ambient temperature.

4. The method of claim 1 wherein said tubular blank is extruded through said second device at ambient temperature.

5. The method of claim 1 which further comprises
    creating a second opening through said tubular blank such that said second opening is generally perpendicular to said continuous opening throughout said length of said tubular blank, wherein said second device further comprises a side punch and said second opening is created using said side punch within said second device.

6. The method of claim 5 wherein said step of creating of said second opening occurs simultaneously with said step of extruding of said tubular blank into said second device.

7. The method of claim 5 wherein said step of creating of said second opening occurs prior to said step of extruding of said tubular blank into said second device.

8. The method of claim 5 wherein said step of creating of said second opening occurs after said step of extruding of said tubular blank into said second device.

9. The method of claim 1 wherein said second punch comprises a head punch portion connected to a reservoir portion connected to a shaft portion and further wherein said reservoir portion of said second punch is concave.

10. The hitch receiver created by the method of claim 1.

11. A method for forming a hitch receiver which comprises:
placing a tubular blank into a first device, wherein said tubular blank includes a continuous opening throughout a length of said tubular blank, further wherein said first device comprises a first die having a longitudinal aperture disposed therein and a first punch wherein said first punch is sized to fit within said first die, further wherein said first die comprises a first inner mandrel sized to fit within at least a portion of said continuous opening throughout said length of said tubular blank and a first exterior forming wall of said die wherein said first exterior forming wall comprises a first head forming portion connected to a first transition forming portion connected to a first body forming portion;
extruding said tubular blank into said first device, wherein said tubular blank is extruded into said first die using said first punch such that said tubular blank is extruded into a volume between said first inner mandrel and said first exterior forming wall;
removing said first punch from said first die;
removing said tubular blank from said first device;
placing said tubular blank into a second device wherein said second device comprises a second die having a longitudinal aperture disposed therein, a second punch, and a side punch, wherein said second punch is sized to fit within said second die, further wherein said second die comprises a second inner mandrel sized to fit within at least a portion of said continuous opening throughout said length of said tubular blank and a second exterior forming wall of said second die, wherein said second exterior forming wall comprises a second head forming portion connected to a second transition forming portion connected to a second body forming portion, and further wherein said second punch comprises a head punch portion connected to a reservoir portion connected to a shaft portion, and further wherein said reservoir portion of said second punch is concave;
extruding said tubular blank into said second device to from said hitch receiver, wherein said tubular blank is extruded into said second die using said second punch such that said tubular blank is extruded into a volume between said second inner mandrel and said second exterior forming wall; and
creating said second opening through a tubular blank such that said second opening is generally perpendicular to said continuous opening throughout said length of said tubular blank, wherein said second opening is created using said side punch within said second device.

12. The method of claim 11 wherein said tubular blank has a generally rectangular cross-section.

13. The method of claim 11 wherein said tubular blank is extruded through said first device at ambient temperature.

14. The method of claim 11 wherein said tubular blank is extruded through said second device at ambient temperature.

15. The method of claim 11 wherein said step of creating of said second opening occurs simultaneously with said step of extruding of said tubular blank into said second device.

16. The method of claim 11 wherein said step of creating of said second opening occurs prior to said step of extruding of said tubular blank into said second device.

17. The method of claim 11 wherein said step of creating of said second opening occurs after said step of extruding of said tubular blank into said second device.

18. The hitch receiver created by the method of claim 11.

19. A method for forming a hitch receiver which comprises placing a tubular blank into a device, wherein said tubular blank includes a continuous opening throughout the length of said tubular blank, further wherein said device comprises a die having a longitudinal aperture disposed therein and a punch wherein said punch is sized to fit within said die, further wherein said die comprises an inner mandrel sized to fit within at least a portion of said continuous opening throughout said length of said tubular blank and an exterior forming wall of said die wherein said exterior forming wall defines a head portion connected to a transition portion connected to a body portion, wherein said tubular blank is extruded into said die using said punch such that said tubular blank is extruded into a volume between said inner mandrel and said exterior forming wall to form said hitch receiver, and further wherein said die and said punch are configured such that the edges of the portion of said tubular blank formed by said head portion of said exterior forming wall of said die are dull-edged.

20. The method of claim 19 wherein said tubular blank has a generally rectangular cross-section.

21. The method of claim 19 wherein said tubular blank is extruded through said device at ambient temperature.

22. The method of claim 19 which further comprises creating a second opening through said tubular blank such that said second opening is generally perpendicular to said continuous opening throughout said length of said tubular blank, wherein said device further comprises a side punch and said second opening is created using said side punch within said device.

23. The method of claim 19 wherein said creating of said second opening occurs simultaneously with said extruding of said tubular blank into said device.

24. The method of claim 19 wherein said creating of said second opening occurs prior to said extruding of said tubular blank into said device.

25. The method of claim 19 wherein said creating of said second opening occurs after said extruding of said tubular blank into said device.

26. The hitch receiver created by the method of claim 19.

* * * * *